US012579690B2

(12) United States Patent (10) Patent No.: US 12,579,690 B2
Birklbauer et al. (45) Date of Patent: *Mar. 17, 2026

(54) INTRINSIC PARAMETERS ESTIMATION IN VISUAL TRACKING SYSTEMS

(71) Applicant: Snap Inc., Santa Monica, CA (US)

(72) Inventors: Clemens Birklbauer, Vienna (AT);
Georg Halmetschlager-Funek, Vienna
(AT); Matthias Kalkgruber, Vienna
(AT); Kai Zhou, Wiener Neudorf (AT)

(73) Assignee: Snap Inc., Santa Monica, CA (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/656,268

(22) Filed: May 6, 2024

(65) Prior Publication Data

US 2024/0289988 A1 Aug. 29, 2024

Related U.S. Application Data

(63) Continuation of application No. 18/198,414, filed on
May 17, 2023, now Pat. No. 12,014,523, which is a
(Continued)

(51) Int. Cl.
*G06T 7/80* (2017.01)
*G06V 10/44* (2022.01)
(Continued)

(52) U.S. Cl.
CPC .............. *G06T 7/80* (2017.01); *G06V 10/443*
(2022.01); *H04N 17/002* (2013.01);
(Continued)

(58) Field of Classification Search
CPC ...... G06T 7/80; G06V 10/443; H04N 17/002;
H04N 23/61; H04N 23/6812; H04N
23/651
See application file for complete search history.

(56) References Cited

U.S. PATENT DOCUMENTS 8,675,101 B1 * 3/2014 Linzer ................... H04N 25/67
348/241
9,813,692 B2 * 11/2017 Zabatani ................. G06F 3/017
(Continued)

FOREIGN PATENT DOCUMENTS

CN 117356089 A 1/2024
WO WO-2022246388 A1 11/2022

OTHER PUBLICATIONS

"U.S. Appl. No. 17/448,655, Non Final Office Action mailed Oct.
20, 2022", 9 pgs.
(Continued)

*Primary Examiner* — Brian P Yenke
(74) *Attorney, Agent, or Firm* — Schwegman Lundberg &
Woessner, P.A.

(57) ABSTRACT

A method for adjusting camera intrinsic parameters of a
multi-camera visual tracking device is described. In one
aspect, a method for calibrating the multi-camera visual
tracking system includes disabling a first camera of the
multi-camera visual tracking system while a second camera
of the multi-camera visual tracking system is enabled,
detecting a first set of features in a first image generated by
the first camera after detecting that the temperature of the
first camera is within the threshold of the factory calibration
temperature of the first camera, and accessing and correcting
intrinsic parameters of the second camera based on the
projection of the first set of features in the second image and
a second set of features in the second image.

20 Claims, 11 Drawing Sheets

Related U.S. Application Data continuation of application No. 17/448,655, filed on Sep. 23, 2021, now Pat. No. 11,688,101.

(60) Provisional application No. 63/189,935, filed on May 18, 2021.

(51) Int. Cl.
| | |
|---|---|
| *H04N 17/00* | (2006.01) |
| *H04N 23/61* | (2023.01) |
| *H04N 23/65* | (2023.01) |
| *H04N 23/68* | (2023.01) |

(52) U.S. Cl.
CPC ........... *H04N 23/61* (2023.01); *H04N 23/651* (2023.01); *H04N 23/6812* (2023.01)

(56) References Cited

U.S. PATENT DOCUMENTS

| | | | |
|---|---|---|---|
| 10,216,236 B1 | 2/2019 | Ashwood et al. | |
| 10,489,975 B2 | 11/2019 | Mendez et al. | |
| 10,607,370 B1* | 3/2020 | El Dokor | H04N 17/002 |
| 11,216,975 B2 | 1/2022 | Rohde | |
| 11,284,058 B2 | 3/2022 | Tsau | |
| 11,367,220 B1* | 6/2022 | El Dokor | G06T 7/0006 |
| 11,463,617 B2 | 10/2022 | Ogawa | |
| 11,662,805 B2* | 5/2023 | Halmetschlager-Funek | G06F 3/038 |
| | | | 345/156 |
| 11,688,101 B2 | 6/2023 | Birklbauer et al. | |
| 11,973,923 B2* | 4/2024 | Zabatani | G06F 3/017 |
| 11,983,897 B2* | 5/2024 | Zhou | G02B 27/0172 |
| 12,014,523 B2 | 6/2024 | Birklbauer et al. | |
| 12,210,672 B2* | 1/2025 | Halmetschlager-Funek | G06F 3/011 |
| 12,243,266 B2* | 3/2025 | Evangelidis | G06T 7/74 |
| 12,333,761 B2* | 6/2025 | Zhou | G02B 27/0172 |
| 12,425,559 B2* | 9/2025 | Zabatani | H04N 13/25 |
| 12,456,225 B2* | 10/2025 | Yamazaki | H04N 23/695 |
| 2015/0193949 A1 | 7/2015 | Katz et al. | |
| 2016/0065848 A1 | 3/2016 | LeBeau et al. | |
| 2017/0094255 A1* | 3/2017 | Zabatani | H04N 13/246 |
| 2017/0163891 A1 | 6/2017 | Kim | |
| 2018/0249082 A1 | 8/2018 | Saito et al. | |
| 2018/0329484 A1 | 11/2018 | Steedly et al. | |
| 2019/0221004 A1 | 7/2019 | Tokita | |
| 2019/0244379 A1* | 8/2019 | Venkataraman | G06T 7/55 |
| 2020/0063913 A1* | 2/2020 | Gubler | G03B 17/561 |
| 2020/0077073 A1 | 3/2020 | Nash et al. | |
| 2020/0084384 A1 | 3/2020 | Wolff et al. | |
| 2020/0137300 A1 | 4/2020 | Ogawa | |
| 2020/0154063 A1 | 5/2020 | Kostrzewa et al. | |
| 2021/0304584 A1 | 9/2021 | Singh et al. | |
| 2021/0344852 A1 | 11/2021 | Isberg et al. | |
| 2022/0206565 A1* | 6/2022 | Halmetschlager-Funek | G06F 3/038 |
| 2022/0375128 A1 | 11/2022 | Birklbauer et al. | |
| 2022/0377239 A1 | 11/2022 | Ding et al. | |
| 2023/0043342 A1 | 2/2023 | Tremblay et al. | |
| 2023/0070217 A1* | 3/2023 | Zabatani | G06F 3/012 |
| 2023/0154044 A1 | 5/2023 | Zhou | |
| 2023/0177711 A1 | 6/2023 | Eguchi et al. | |
| 2023/0205311 A1* | 6/2023 | Halmetschlager-Funek | G06F 3/038 |
| | | | 345/156 |
| 2023/0228626 A1 | 7/2023 | Shim et al. | |
| 2023/0296408 A1* | 9/2023 | Viala | G01C 25/00 |
| | | | 702/94 |
| 2023/0360267 A1 | 11/2023 | Birklbauer et al. | |
| 2024/0095958 A1* | 3/2024 | Yamazaki | G06V 20/20 |
| 2024/0192024 A1* | 6/2024 | Halmetschlager-Funek | G06F 3/011 |
| 2024/0221212 A1* | 7/2024 | Evangelidis | G06T 7/74 |
| 2024/0221222 A1* | 7/2024 | Zhou | G06T 7/73 |
| 2024/0283902 A1* | 8/2024 | Zabatani | H04N 13/243 |
| 2024/0303934 A1* | 9/2024 | Muttenthaler | G06T 7/70 |
| 2025/0047980 A1* | 2/2025 | Lee | G02B 27/646 |
| 2025/0068228 A1* | 2/2025 | Chatzikalymnios | G06V 40/107 |
| 2025/0093948 A1* | 3/2025 | Halmetschlager-Funek | G06F 3/012 |
| 2025/0182324 A1* | 6/2025 | Evangelidis | G06T 7/74 |
| 2025/0278860 A1* | 9/2025 | Zhou | G06T 7/80 |

OTHER PUBLICATIONS

"U.S. Appl. No. 17/448,655, Notice of Allowance mailed Feb. 15, 2023", 8 pgs.

"U.S. Appl. No. 17/448,655, Response filed Jan. 19, 2023 to Non Final Office Action mailed Oct. 20, 2022", 13 pgs.

"U.S. Appl. No. 17/448,655, Response filed Oct. 11, 2022 to Restriction Requirement mailed Aug. 11, 2022", 8 pgs.

"U.S. Appl. No. 17/448,655, Restriction Requirement mailed Aug. 11, 2022", 7 pgs.

"U.S. Appl. No. 18/198,414, Non Final Office Action mailed Dec. 20, 2023", 9 pgs.

"U.S. Appl. No. 18/198,414, Notice of Allowance mailed Feb. 12, 2024", 5 pgs.

"U.S. Appl. No. 18/198,414, Response filed Jan. 9, 2024 to Non Final Office Action mailed Dec. 20, 2023", 8 pgs.

"International Application Serial No. PCT/US2022/072347, International Preliminary Report on Patentability mailed Nov. 30, 2023", 8 pgs.

"International Application Serial No. PCT/US2022/072347, International Search Report mailed Sep. 9, 2022", 5 pgs.

"International Application Serial No. PCT/US2022/072347, Written Opinion mailed Sep. 9, 2022", 6 pgs.

Nikolic, Janosch, et al., "Maximum Likelihood Identification of Inertial Sensor Noise Model Parameters", IEEE Sensors Journal, IEEE, USA, vol. 16, No. 1, (Jan. 1, 2016), 163-176.

"Korean Application Serial No. 10-2023-7042533, Notice of Preliminary Rejection mailed Aug. 25, 2024", w/ English translation, 9 pgs.

"Korean Application Serial No. 10-2023-7042533, Response filed Oct. 25, 2024 to Notice of Preliminary Rejection mailed Aug. 25, 2024", w/ English Claims, 23 pgs.

* cited by examiner

702   DETECT TEMPERATURE OF CAMERA A

704   ACCESS TEMPERATURE PROFILE OF CAMERA A

706   IDENTIFY INTRINSIC PARAMETERS BASED ON DETECTED TEMPERATURE AND TEMPERATURE PROFILE

708   APPLY IDENTIFIED INTRINSIC PARAMETERS TO FEATURE PROJECTION

INTRINSIC PARAMETERS ESTIMATION IN VISUAL TRACKING SYSTEMS

CLAIM OF PRIORITY

The present application is a continuation of U.S. patent application Ser. No. 18/198,414, filed May 17, 2023, which is a continuation of U.S. patent application Ser. No. 17/448, 655, filed Sep. 23, 2021, which application claims the benefit of priority to U.S. Provisional Patent Application Ser. No. 63/189,935, filed May 18, 2021, both of which are hereby incorporated by reference in their entireties.

TECHNICAL FIELD

The subject matter disclosed herein generally relates to a visual tracking system. Specifically, the present disclosure addresses systems and methods for calibrating multiple cameras of a visual tracking systems.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

Both AR and VR devices rely on motion tracking systems that track a pose (e.g., orientation, position, location) of the device. A motion tracking system is typically factory calibrated (based on predefined/known relative positions between the cameras and other sensors) to accurately display the virtual content at a desired location relative to its environment. However, factory calibration parameters are based on factory conditions that are different from user operating conditions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
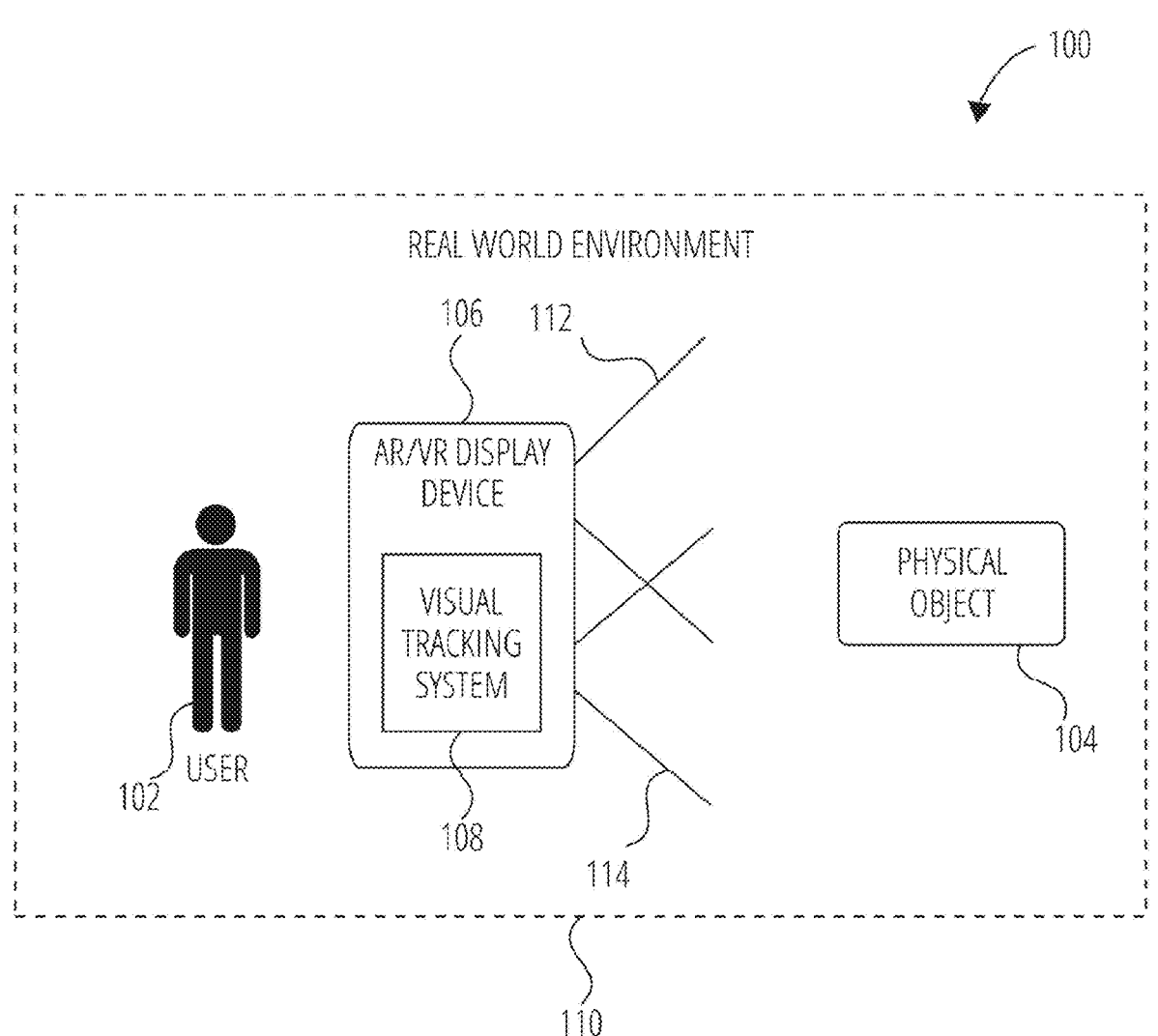
FIG. 1 is a block diagram illustrating an environment for operating a visual tracking system in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The "visual tracking system" is used herein to refer to a computer-operated application or system that enables a system to track visual features identified in images captured by one or more cameras of the visual tracking system, and build a model of a real-world environment based on the tracked visual features. Non-limiting examples of the visual tracking system include: a Visual Simultaneous Localization and Mapping system (VSLAM), and Visual-Inertial Simultaneous Localization and Mapping system (VI-SLAM). VSLAM can be used to build a target from an environment or a scene based on one or more cameras of the visual tracking system. VI-SLAM (also referred to as a visual-inertial tracking system) determines the latest position or pose of a device based on data acquired from multiple sensors (e.g., depth cameras, inertial sensors) of the device.

The term "intrinsic parameters" is used herein to refer to parameters that are based on conditions internal to the camera. Non-limiting examples of intrinsic parameters include: camera focal lengths, resolution, field of view, internal temperature of the camera, and internal measurement offset.

The term "extrinsic parameters" is used herein to refer to parameters that are based on conditions external to the camera. Non-limiting examples of extrinsic parameters include: ambient temperature (e.g., temperature of an environment in which the camera operates), and position and orientation of the camera relative to other sensors.

AR/VR applications enable a user to access information, such as in the form of virtual content rendered in a display of an AR/VR display device (also referred to as a display device). The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to a physical object of interest. In order to do this, the AR display device detects the physical object and tracks a pose of the AR display device relative to a position of the physical object. A pose identifies a position and orientation of the display device relative to a frame of reference or relative to another object. For VR, the virtual object appears at a location (in the virtual environment) based on the pose of the VR display device. The virtual content is therefore refreshed based on a latest position of the device.

Cameras of the visual tracking system are subject to distortion, for example, due to heat generated by the cameras and other components connected or in proximity to the cameras. One example process is to calibrate optical cameras to obtain the distortion model (e.g., camera intrinsics). For AR/VR devices, calibration is a standard process to be carried on after manufacturing. This process is referred to as "factory calibration." Factory calibration is typically performed only once because the process is time consuming. For example, during factory calibration, the display device usually only runs the calibration program in a user environment that is often different from the factory calibration environment. In the factory calibration environment, only a few background applications operate at the display device, the display and processors in the display device are also consuming less power (and thus generate less heat). In the real-world environment, many background applications are running, the display and processor in the display device are also consuming much more power (and thus generate more heat).

The present application describes a method for identifying changes in camera distortion under various thermal conditions, and for generating a temperature-based distortion model (resulting in higher quality VSLAM). In other words, the present application describes an online camera distortion estimation method that produces a distortion model of one or more cameras of a display device at a given temperature condition. In one example, a tracking calibration component turns off a first camera of a multiple camera tracking system to reduce the temperature of the first camera so that the temperature of the camera is close to the temperature of the first camera at factory calibration (also referred to as factory calibration temperature). Once the temperature of the first camera reaches the factory calibration temperature, the tracking calibration component turns the first camera back on. The visual tracking system uses only the first camera in a 6DOF (degrees of freedom) tracking to gather 3D information (e.g., features) about its environment. In one example, the visual-inertial tracking system operates as a mono VI-SLAM system using only the first camera. Features detected by the first camera are projected onto an image of the second camera. The visual-inertial tracking system identifies detected features (on the second camera) that correspond to the projected features (from the first camera). The tracking calibration component generates a temperature distortion model that identifies distortions based on the camera temperature, and the pairs of projected and detected features. The tracking calibration component can then determine intrinsic parameters of the second camera for a specific temperature based on the temperature distortion model. The visual-inertial tracking system adjusts and corrects the features detected by the second camera with the intrinsic parameters of the second camera that is operating at the specific temperature.

In one example embodiment, the present application describes a method for adjusting camera intrinsic parameters of a multi-camera visual-inertial tracking device. In one aspect, a method for calibrating the multi-camera visual tracking system includes disabling a first camera of the multi-camera visual tracking system while a second camera of the multi-camera visual tracking system is enabled, detecting a first set of features in a first image generated by the first camera after detecting that the temperature of the first camera is within the threshold of the factory calibration temperature of the first camera, and accessing and correcting intrinsic parameters of the second camera based on the projection of the first set of features in the second image and a second set of features in the second image.

As a result, one or more of the methodologies described herein facilitate solving the technical problem of calibrating camera intrinsic parameters based on operating conditions that are different from factory conditions. The presently described method provides an improvement to an operation of the functioning of a computer by providing further accurate calibration computation to enhance a VI-SLAM pose estimation. Furthermore, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a network diagram illustrating an environment 100 suitable for operating an AR/VR display device 106, according to some example embodiments. The environment 100 includes a user 102, an AR/VR display device 106, and a physical object 104. The user 102 operates the AR/VR display device 106. The user 102 may be a human user (e.g., a human being), a machine user (e.g., a computer configured by a software program to interact with the AR/VR display device 106), or any suitable combination thereof (e.g., a human assisted by a machine or a machine supervised by a human). The user 102 is associated with the AR/VR display device 106.

The AR/VR display device 106 includes a computing device having a display such as a smartphone, a tablet computer, or a wearable computing device (e.g., watch or glasses). The computing device may be hand-held or may be removable mounted to a head of the user 102. In one example, the display includes a screen that displays images captured with the cameras of the AR/VR display device 106. In another example, the display of the device may be transparent such as in lenses of wearable computing glasses. In other examples, the display may be non-transparent, partially transparent, or partially opaque. In yet other examples, the display may be wearable by the user 102 to completely or partially cover the field of vision of the user 102.

The AR/VR display device 106 includes an AR application (not shown) that causes a display of virtual content based on images detected with the cameras of the AR/VR display device 106. For example, the user 102 may point multiple cameras of the AR/VR display device 106 to capture an image of the physical object 104. The physical object 104 is within a field of view 112 of a first camera (not shown) of the AR/VR display device 106 and within a field of view 114 of a second camera (not shown) of the AR/VR display device 106. The AR application generates virtual content corresponding to an identified object (e.g., physical object 104) in the image and presents the virtual content in a display (not shown) of the AR/VR display device 106.

The AR/VR display device 106 includes a visual tracking system 108. The visual tracking system 108 tracks the pose (e.g., position and orientation) of the AR/VR display device 106 relative to the real world environment 110 using, for example, optical sensors (e.g., depth-enabled 3D camera, image camera), inertial sensors (e.g., gyroscope, accelerometer), magnetometer, wireless sensors (Bluetooth, Wi-Fi), GPS sensor, and audio sensor. In one example, the visual tracking system 108 includes a visual Simultaneous Localization and Mapping system (VSLAM) that operates with multiple cameras of the AR/VR display device 106. In one example, the AR/VR display device 106 displays virtual content based on the pose of the AR/VR display device 106 relative to the real world environment 110 and/or the physical object 104 (as determined by the visual tracking system 108). The visual tracking system 108 is described in more detail below with respect to FIG. 3.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 5 to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

In one example, the AR/VR display device 106 operates without communicating with a computer network. In another example, the AR/VR display device 106 communicates with the computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
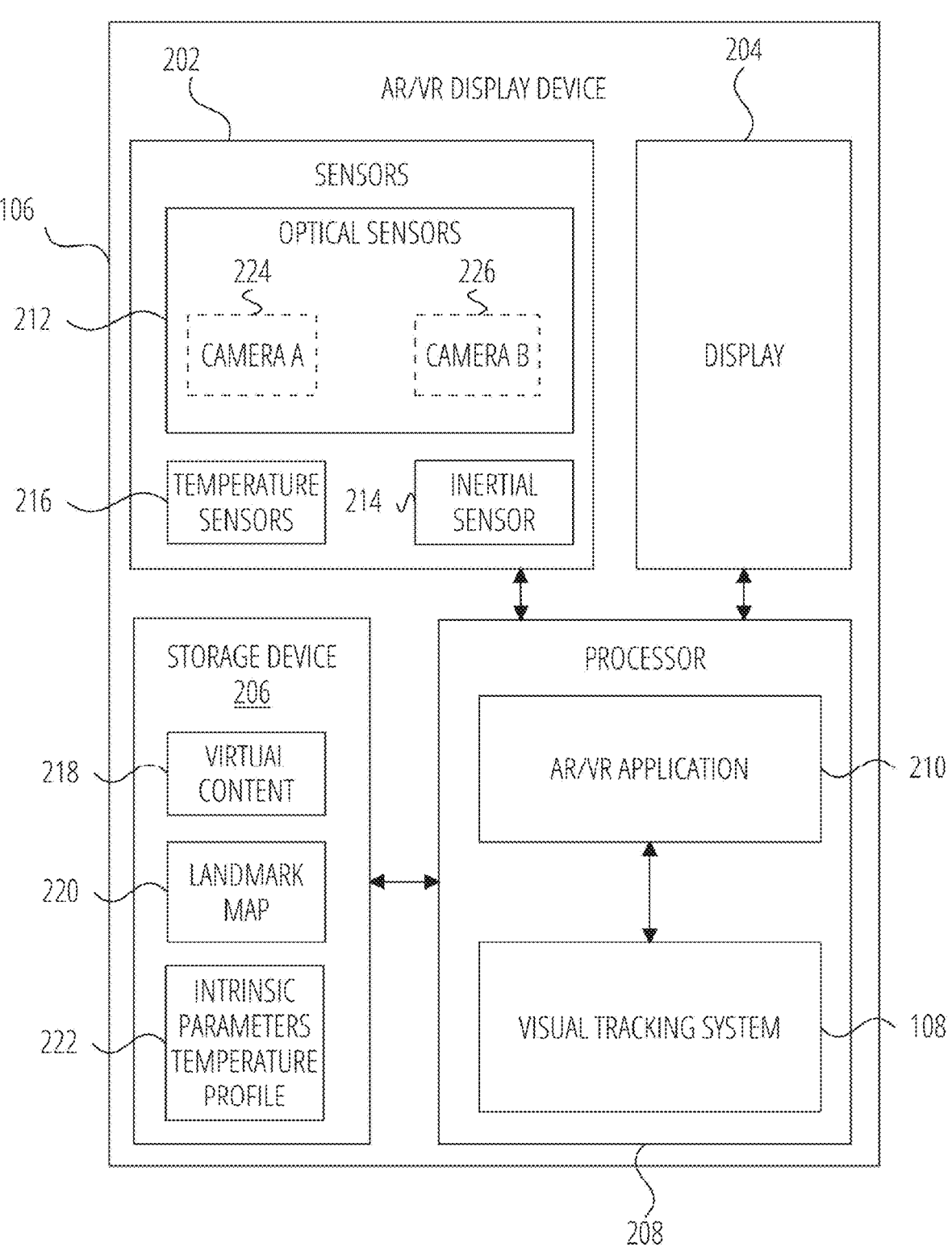
FIG. 2 is a block diagram illustrating a display device in accordance with one example embodiment.

FIG. 2 is a block diagram illustrating modules (e.g., components) of the AR/VR display device 106, according to some example embodiments. The AR/VR display device 106 includes sensors 202, a display 204, a processor 208, and a storage device 206. Examples of AR/VR display device 106 include a wearable computing device, a mobile computing device (such as a smart phone or smart tablet), a navigational device, a portable media device.

The sensors 202 include, for example, optical sensors 212 (e.g., camera such as a color camera, a thermal camera, a depth sensor and one or multiple grayscale tracking cameras), an inertial sensor 214 (e.g., gyroscope, accelerometer, magnetometer), and temperature sensors 216. In one example, the optical sensors 212 include two or more cameras (e.g., a first camera A 224 and a second camera B 226). The temperature sensors 216 measure the temperature of the optical sensors 212, or the component attached or connected to the optical sensors 212. The temperature sensors 216 measure the temperature of the optical sensors 212. In one example, the temperature sensors 216 include a temperature sensor (not shown) disposed on a component of the AR/VR display device 106 between the camera A 224 and the camera B 226. In another example, the temperature sensors 216 include a first temperature sensor (not shown) connected to the camera A 224 and a second temperature sensor (not shown) connected to the camera B 226. In yet another example, the first temperature sensor is disposed on a component adjacent to the camera A 224, and a second temperature sensor is disposed on a component adjacent to the camera B 226.

Other examples of sensors 202 include a proximity or location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-opaque so that the user 102 can see through the display 204 (in AR use case). In another example embodiment, the display 204 covers the eyes of the user 102 and blocks out the entire field of view of the user 102 (in VR use case). In another example, the display 204 includes a touchscreen display configured to receive a user input via a contact on the touchscreen display.

The processor 208 includes an AR/VR application 210 and a visual tracking system 108. The AR/VR application 210 detects the physical object 104 using computer vision based on the detected features of the environment processed by the visual tracking system 108. The AR/VR application 210 retrieves virtual content (e.g., 3D object model) based on the identified physical object 104 or physical environment. The AR/VR application 210 renders the virtual object in the display 204. In one example embodiment, the AR/VR application 210 includes a local rendering engine that generates a visualization of virtual content overlaid (e.g., superimposed upon, or otherwise displayed in tandem with) on an image of the physical object 104 captured by the optical sensors 212. A visualization of the virtual content may be manipulated by adjusting a position of the physical object 104 (e.g., its physical location, orientation, or both) relative to the optical sensors 212. Similarly, the visualization of the virtual content may be manipulated by adjusting a pose of the AR/VR display device 106 relative to the physical object 104. For a VR application, the AR/VR application 210 displays the virtual content in an immersive virtual world displayed in the display 204 at a location (in the display 204) determined based on a pose of the AR/VR display device 106.

The visual tracking system 108 estimates a pose of the AR/VR display device 106. For example, the visual tracking system 108 uses image data and corresponding inertial data from the optical sensors 212 and the inertial sensor 214 to track a location and pose of the AR/VR display device 106 relative to a frame of reference (e.g., detected features in the real world environment 110). In one example embodiment, the visual tracking system 108 operates independently and asynchronously from the AR/VR application 210. For example, the visual tracking system 108 operates offline without receiving any tracking request from the AR/VR application 210. In another example, the visual tracking system 108 operates when the AR/VR application 210 is operating at the AR/VR display device 106. The visual tracking system 108 identifies camera intrinsics parameters of the optical sensors 212 and adjusts detected features in images based on the camera intrinsics parameters corresponding to a measured temperature of the optical sensors 212.

In one example embodiment, the visual tracking system 108 turns off the camera A 224 to reduce the temperature of the camera A 224 so that the temperature of the camera A 224 is close to (e.g., within one degree Celsius) the factory calibration temperature of camera A 224. Once the temperature of the camera A 224 reaches the factory calibration temperature, the visual tracking system 108 turns the camera A 224 back on. The visual tracking system 108 uses only the camera A 224 in a 6DOF (degrees of freedom) tracking to gather 3D information (e.g., features) about its environment. In one example, the visual tracking system 108 operates as a mono VI-SLAM system relying only on camera A 224 (and not camera B 226). Features detected by the camera A 224 are projected onto an image of the camera B 226. The visual tracking system 108 identifies detected features (from the camera B 226) that correspond to the projected features (from the camera A 224). The visual tracking system 108 forms a temperature distortion model that identifies distortions based on the camera temperature, and the pairs of projected and detected features. The visual tracking system 108 can then determine intrinsic parameters of the camera B 226 for a specific temperature based on the temperature distortion model. The visual tracking system 108 can adjust and correct the features detected by the camera B 226 with the intrinsic parameters of the camera B 226 that is operating at a specific temperature. Example components of the visual tracking system 108 is described in more detail below with respect to FIG. 3.

The storage device 206 stores virtual content 218, landmark map 220, and intrinsic parameters temperature profile 222. The virtual content 218 includes, for example, a database of visual references (e.g., images of physical objects) and corresponding experiences (e.g., two-dimensional or three-dimensional virtual object models). The landmark map 220 stores a map of an environment based on features detected by the visual tracking system 108. The intrinsic parameters temperature profile 222 include, for example, a temperature profile of the optical sensors 212 for the visual tracking system 108. In one example, the intrinsic parameters temperature profile 222 stores a temperature model that identifies camera intrinsic parameters for any temperature.

Any one or more of the modules described herein may be implemented using hardware (e.g., a Processor of a machine) or a combination of hardware and software. For example, any module described herein may configure a Processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
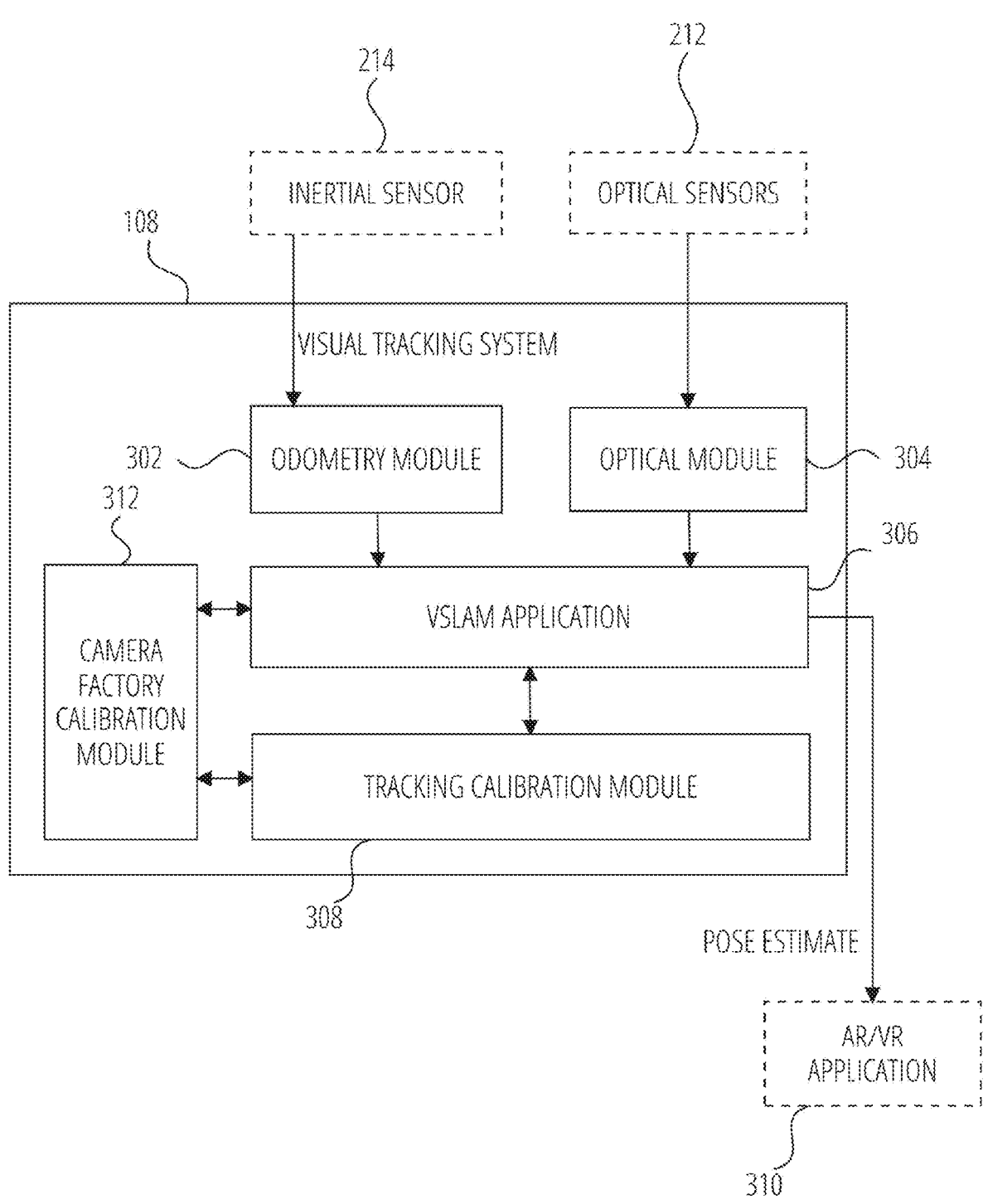
FIG. 3 is a block diagram illustrating a visual tracking system in accordance with one example embodiment.

FIG. 3 illustrates the visual tracking system 108 in accordance with one example embodiment. The visual tracking system 108 includes, for example, an odometry module 302, an optical module 304, a VSLAM application 306, a tracking calibration module 308, and a camera factory calibration module 312. The odometry module 302 accesses inertial sensor data from the inertial sensor 214. The optical module 304 accesses optical sensor data from the optical sensors 212.

The VSLAM application 306 determines a pose (e.g., location, position, orientation) of the AR/VR display device 106 relative to a frame of reference (e.g., real world environment 110). In one example embodiment, the VSLAM application 306 includes a visual odometry system that estimates the pose of the AR/VR display device 106 based on 3D maps of feature points from images captured with the optical sensors 212 and the inertial sensor data captured with the inertial sensor 214. The VSLAM application 306 is capable of operating as a stereo VI-SLAM and monocular VI-SLAM. In other words, the VSLAM application 306 can toggle its operation between the monocular and stereo VI-SLAM without the interruption of localization and mapping. The VSLAM application 306 provides the pose information to the AR/VR application 310 so that the AR/VR application 310 can render virtual content at display location that is based on the pose information.

The tracking calibration module 308 identifies intrinsic parameters based on detected features from the camera B 226 (operating a higher temperature than camera A 224) and projected features from the camera A 224 (operating a lower temperature than camera A 224 or at the factory calibration temperature). The tracking calibration module 308 forms a temperature profile model based on pairs of projected and detected features and measured camera temperature. In one example, the tracking calibration module 308 accesses the camera intrinsic parameters from the camera factory calibration module 312 to identify the factory calibration temperature. The VSLAM application 306 adjusts or modifies the features detected by the one of the cameras based on the temperature profile model. The tracking calibration module 308 is described in more detail below with respect to FIG. 4.

Figure 4:
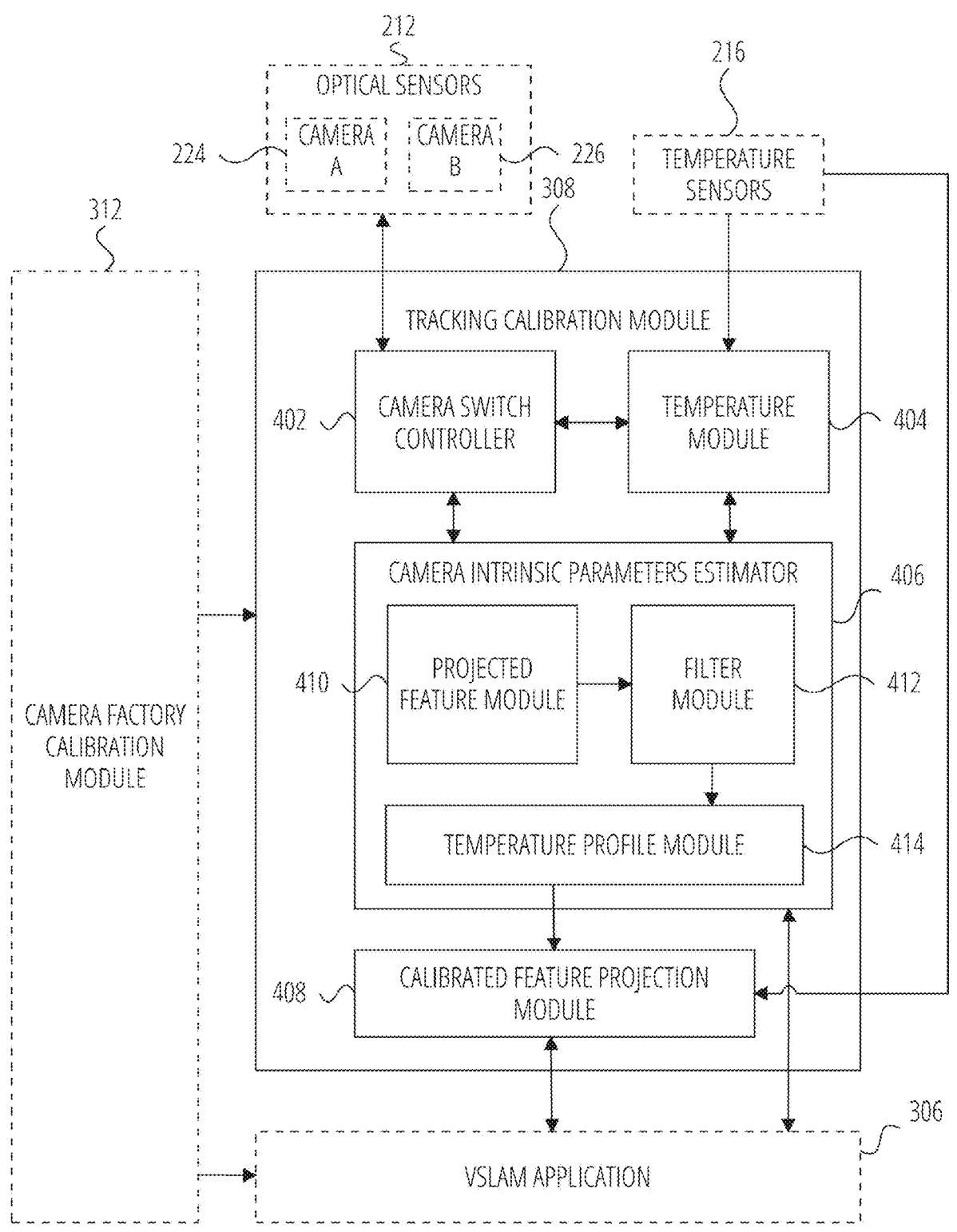
FIG. 4 is a block diagram illustrating a tracking calibration module in accordance with one example embodiment.

FIG. 4 is a block diagram illustrating a tracking calibration module 308 in accordance with one example embodiment. The tracking calibration module 308 includes a camera switch controller 402, a temperature module 404, a camera intrinsic parameters estimator 406, and a calibrated feature projection module 408.

The camera switch controller 402 switches on or off the optical sensors 212. In one example, the camera switch controller 402 turns off the camera A 224 to reduce the temperature of the camera A 224. The temperature module 404 accesses temperature data from the temperature sensors 216. The camera intrinsic parameters estimator 406 determines that the measured temperature of the camera A 224 has reached or is within a preset threshold (e.g., within one degree Celsius) of the factory calibration temperature, the camera intrinsic parameters estimator 406 issues a command to the camera switch controller 402 to turn the camera A 224 back on. The VSLAM application 306 operates as a mono VSLAM system relying only on camera B 226 while camera A 224 is turned off. The VSLAM application 306 operates using camera A 224 when camera A 224 is turned back on. In one example, the visual tracking system 108 operates as a mono VSLAM system relying only on camera A 224 (and not camera B 226).

The camera intrinsic parameters estimator 406 determines intrinsic parameters of the camera A 224 and forms a temperature profile model. The camera intrinsic parameters estimator 406 includes a projected feature module 410, a filter module 412, and a temperature profile module 414.

The projected feature module 410 detects features in an image from camera A 224 (after it is turned back on). Those features are projected onto a corresponding image from camera B 226. The projected feature module 410 identifies detected features (from the camera B 226) that correspond to the projected features (from the camera A 224).

The filter module 412 filters out pairs of detected and projected features. In one example, the filter module 412 removes outliers by (1) verifying that the changing direction between feature points is from center to borders (e.g., outward) in an image, (2) verifying that the pixels range or shift is within a preset range (e.g., from the center to edge, changing from 0 pixels to ~2 pixels), (3) finding the optical flow center which has the maximum number of inliers, and (4) verifying that the pixel shifting that is closer to the optical center is less than the pixels are located further away to the center.

The temperature profile module 414 forms a temperature distortion model that identifies distortions based on the camera temperature, and the pairs of projected and detected features. The visual tracking system 108 can then determine intrinsic parameters of the camera A 224 for a specific temperature based on the temperature distortion model. The visual tracking system 108 can adjust and correct the features detected by the camera A 224 with the intrinsic parameters of the camera A 224 that is operating at a specific temperature.

The calibrated feature projection module 408 accesses the filtered pairs of projected and detected features from the filter module 412 to identify camera intrinsics parameters based on a temperature of the optical sensors 212 (as detected by temperature sensors 216) and the temperature distortion model. Given the filtered projected/detected feature pairs, the temperature profile module 414 calculates new camera intrinsics parameters for any temperature. For any given temperature t, the temperature profile module 414 identifies the intrinsics i, which can be used to project 3D features on image at location P, and the sum distances between all the P and corresponding detected features at location D, where the sum is minimized.

The following sample pseudo-code illustrates an example of an implementation in the calibrated feature projection module 408:

```
\documentclass{article} \usepackage{amsmath}
% limits underneath \DeclareMathOperator*{\argminA}{arg\,min}
\begin{document}
\begin{align} & \argminA_{i \in I, t} f(i, t) := \{ i \in I, t \mid
\forall_k \in I : f(k, t) \geq f(i, t)\} \\ & f(i, t) :=
\sum_{\substack{(P, D) \in S \\ j \in \{1, 2,,,n\}}} |P_{i, t}^{j} -
D^{j}|\\ & i := \theta(FocalLength, PrincipalPoints,
```

-continued

```
RadialDistortion)
\end{align}
\end{document}
```

Figure 5:
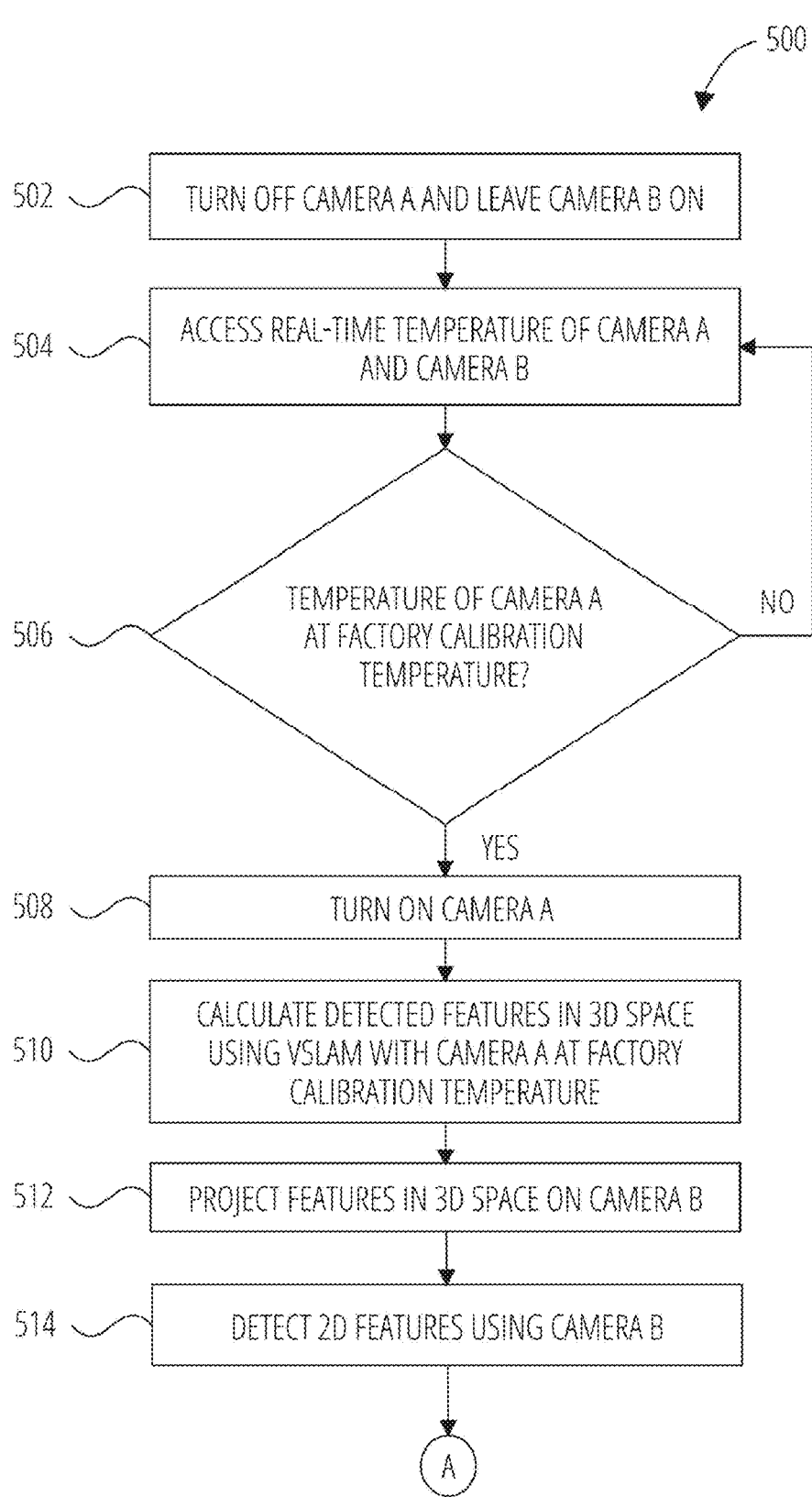
FIG. 5 is a flow diagram illustrating a method for projecting features in accordance with one example embodiment.

FIG. 5 is a flow diagram illustrating a method 500 for projecting features in accordance with one example embodiment. Operations in the method 500 may be performed by the tracking calibration module 308, using components (e.g., modules, engines) described above with respect to FIG. 4. Accordingly, the method 500 is described by way of example with reference to the tracking calibration module 308. However, it shall be appreciated that at least some of the operations of the method 500 may be deployed on various other hardware configurations or be performed by similar Components residing elsewhere.

In block 502, the camera switch controller 402 turns off camera A 224 and leaves camera B 226 on. In block 504, the temperature module 404 accesses real-time temperature of camera A 224 and camera B 226. In decision block 506, the projected feature module 410 determines whether the temperature of camera A 224 is within a threshold range of the factory calibration temperature of camera A 224. In block 508, the projected feature module 410 turns on camera A 224 in response to determining that the temperature of camera A 224 is within a threshold range of the factory calibration temperature of camera A 224.

In block 510, the projected feature module 410 calculates detected features in 3D space using VSLAM with camera A 224 at its factory calibration temperature. In block 512, the projected feature module 410 projects features in 3D space on camera B 226. In block 514, the projected feature module 410 detects 2D features using camera B 226.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 6:
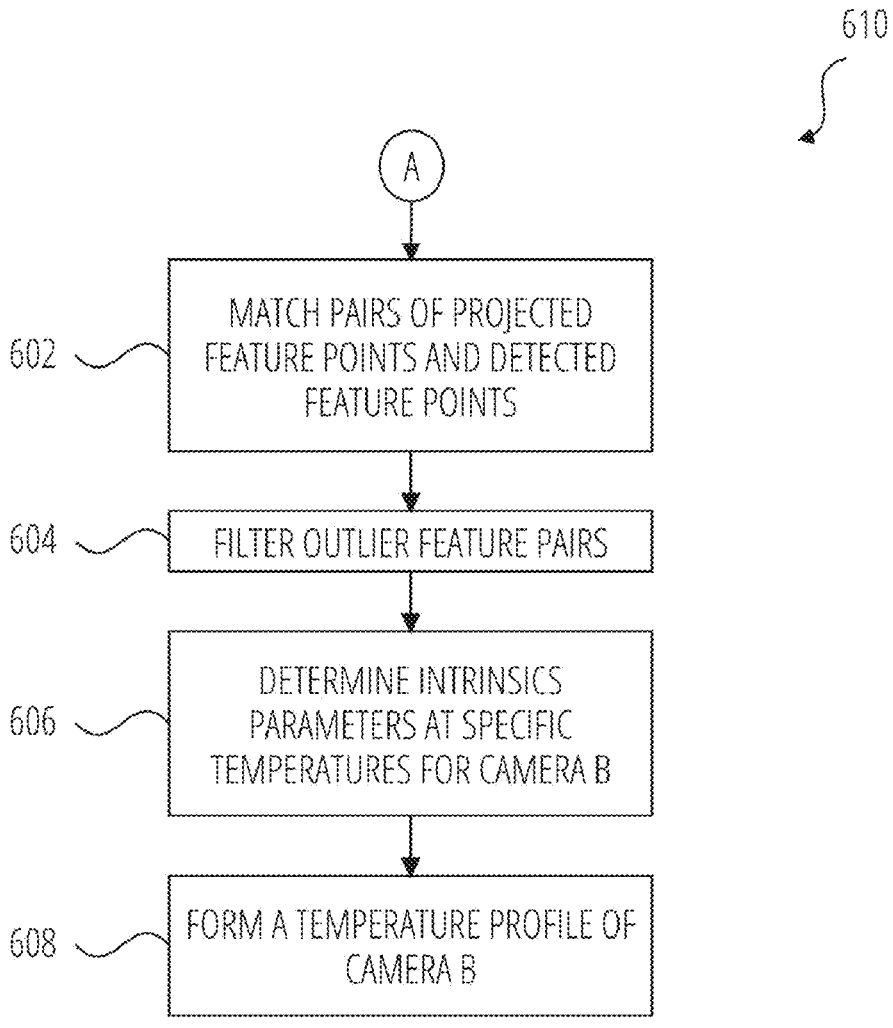
FIG. 6 is a flow diagram illustrating a method for forming a temperature profile in accordance with one example embodiment.

FIG. 6 is a flow diagram illustrating a method 610 for forming a temperature profile in accordance with one example embodiment. Operations in the method 610 may be performed by the tracking calibration module 308, using components (e.g., modules, engines) described above with respect to FIG. 4. Accordingly, the method 610 is described by way of example with reference to the tracking calibration module 308. However, it shall be appreciated that at least some of the operations of the method 610 may be deployed on various other hardware configurations or be performed by similar components residing elsewhere.

In block 602, the projected feature module 410 matches pairs of projected feature points and detected feature points. In block 604, the filter module 412 filters outlier feature pairs. In block 606, the temperature profile module 414 determines intrinsics parameters at specific temperatures for camera B 226. In block 608, the temperature profile module 414 forms a temperature profile of camera B 226.

Figure 7:
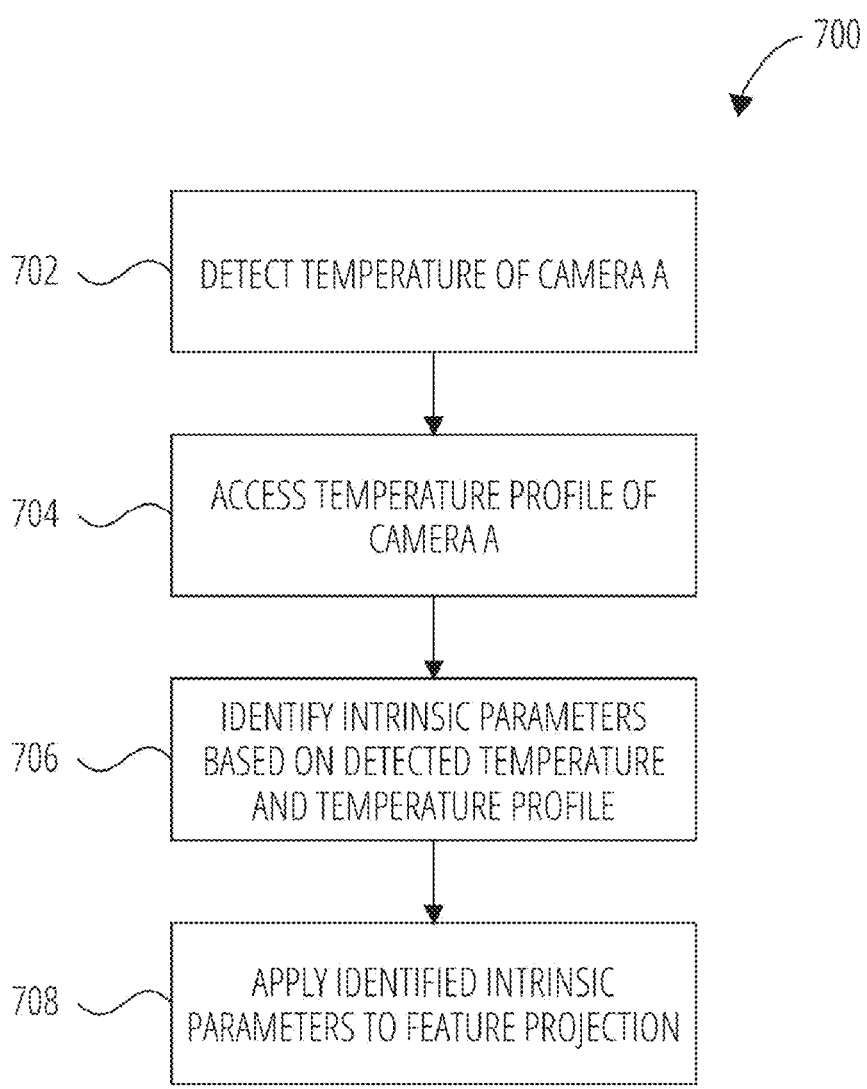
FIG. 7 is a flow diagram illustrating a method for identifying intrinsic parameters in accordance with one example embodiment.

FIG. 7 is a flow diagram illustrating a routine 700 for identifying intrinsic parameters in accordance with one example embodiment. Operations in the routine 700 may be performed by the tracking calibration module 308, using components (e.g., modules, engines) described above with respect to FIG. 4. Accordingly, the routine 700 is described by way of example with reference to the tracking calibration module 308. However, it shall be appreciated that at least some of the operations of the routine 700 may be deployed on various other hardware configurations or be performed by similar components residing elsewhere.

In block 702, the temperature module 404 detects a temperature of camera A 224. In block 704, the calibrated feature projection module 408 accesses a temperature profile of camera A 224. In block 706, the calibrated feature projection module 408 identifies intrinsic parameters based on the measured temperature and the retrieved temperature profile. In block 708, the calibrated feature projection module 408 applies the identified intrinsic parameters to feature projection.

Figure 8:
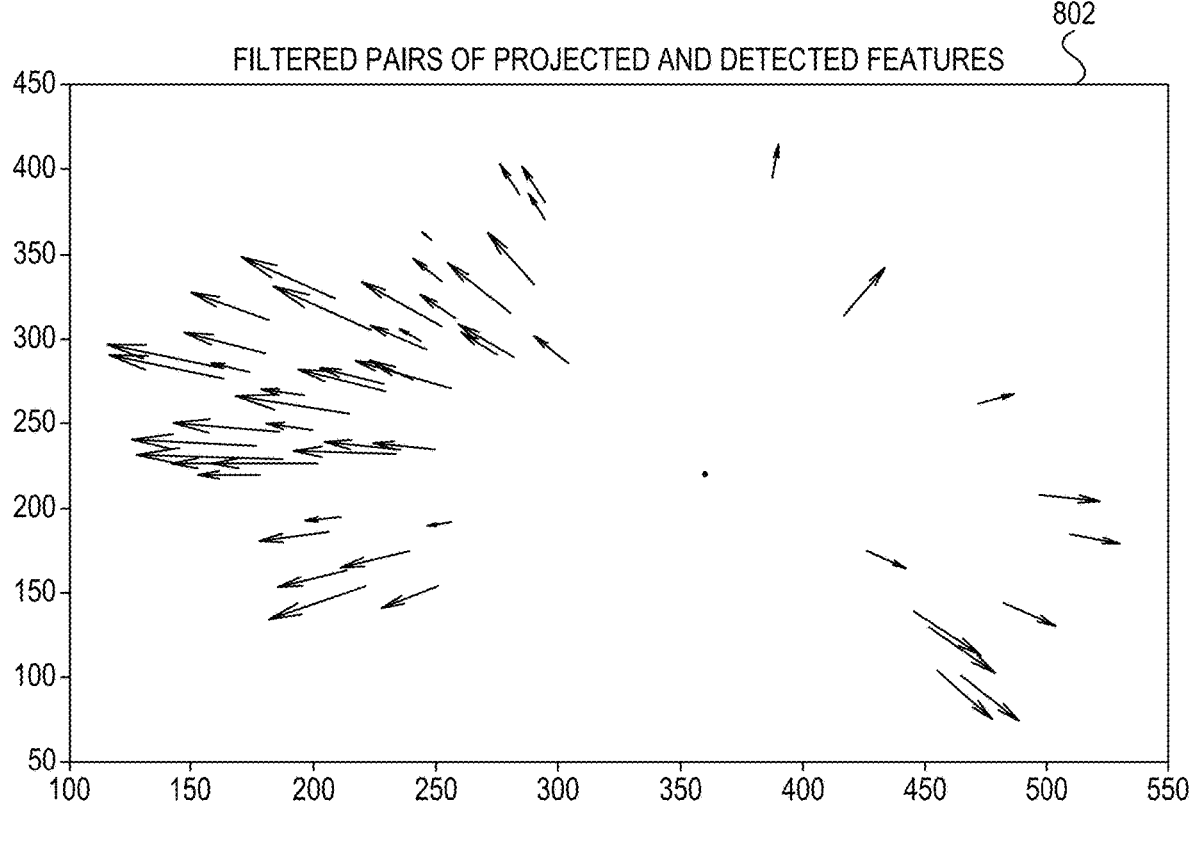
FIG. 8 illustrates an aspect of the subject matter in accordance with one embodiment.

FIG. 8 illustrates a graph depicting filtered pairs of projected and detected features 802 in accordance with one embodiment.

System with Head-Wearable Apparatus

Figure 9:
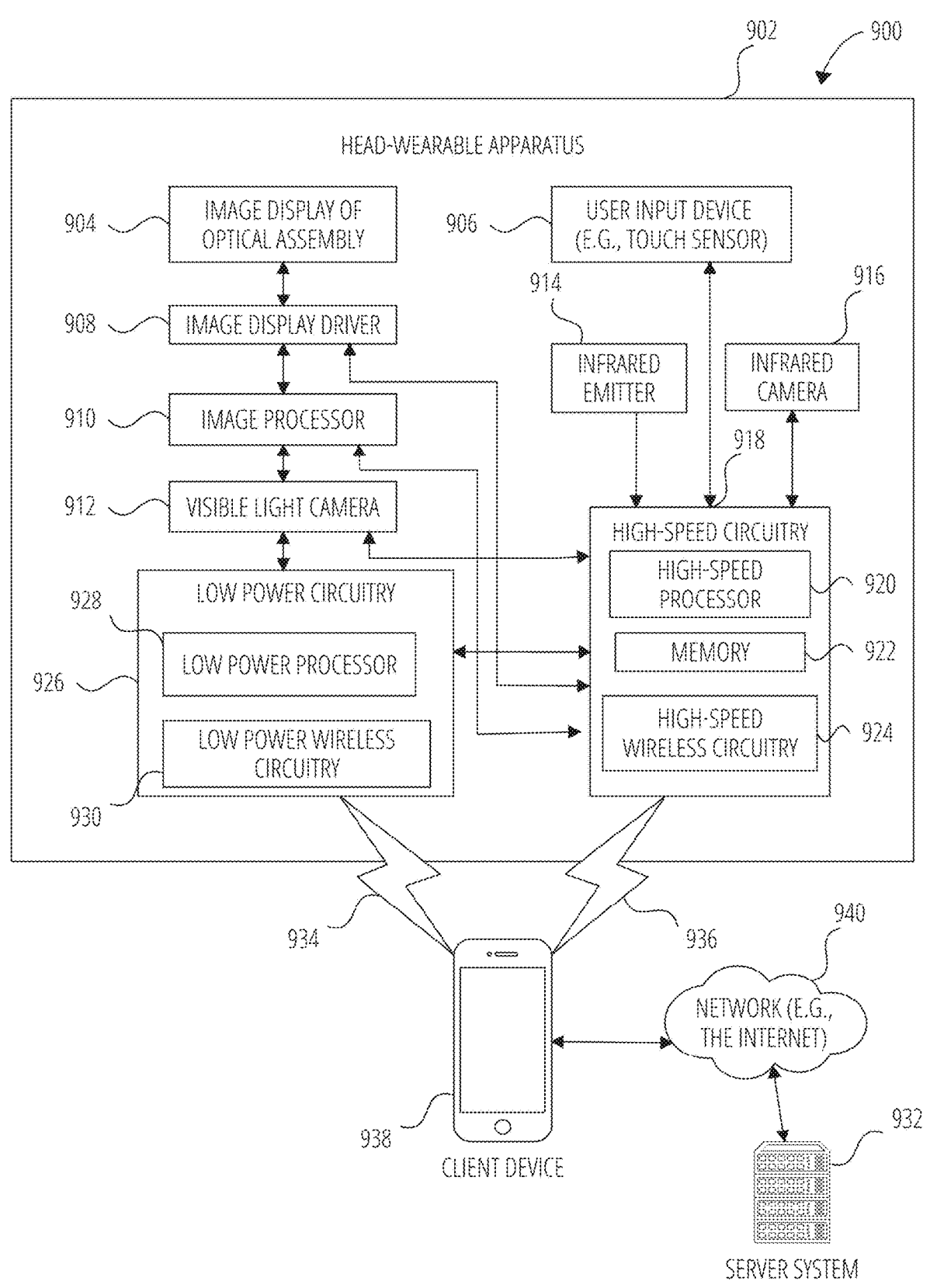
FIG. 9 illustrates a network environment in which a head-wearable device can be implemented according to one example embodiment.

FIG. 9 illustrates a network environment 900 in which the head-wearable apparatus 902 can be implemented according to one example embodiment. FIG. 9 is a high-level functional block diagram of an example head-wearable apparatus 902 communicatively coupled a mobile client device 938 and a server system 932 via various network 940.

head-wearable apparatus 902 includes a camera, such as at least one of visible light camera 912, infrared emitter 914 and infrared camera 916. The client device 938 can be capable of connecting with head-wearable apparatus 902 using both a communication 934 and a communication 936. client device 938 is connected to server system 932 and network 940. The network 940 may include any combination of wired and wireless connections.

The head-wearable apparatus 902 further includes two image displays of the image display of optical assembly 904. The two include one associated with the left lateral side and one associated with the right lateral side of the head-wearable apparatus 902. The head-wearable apparatus 902 also includes image display driver 908, image processor 910, low-power low power circuitry 926, and high-speed circuitry 918. The image display of optical assembly 904 are for presenting images and videos, including an image that can include a graphical user interface to a user of the head-wearable apparatus 902.

The image display driver 908 commands and controls the image display of the image display of optical assembly 904. The image display driver 908 may deliver image data directly to the image display of the image display of optical assembly 904 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 902 includes a frame and stems (or temples) extending from a lateral side of the frame. The head-wearable apparatus 902 further includes a user input device 906 (e.g., touch sensor or push button) including an input surface on the head-wearable apparatus 902. The user input device 906 (e.g., touch sensor or push button) is to receive from the user an input selection to manipulate the graphical user interface of the presented image.

The components shown in FIG. 9 for the head-wearable apparatus 902 are located on one or more circuit boards, for example a PCB or flexible PCB, in the rims or temples. Alternatively, or additionally, the depicted components can be located in the chunks, frames, hinges, or bridge of the head-wearable apparatus 902. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 902 includes a memory 922 which stores instructions to perform a subset or all of the functions described herein. memory 922 can also include storage device.

As shown in FIG. 9, high-speed circuitry 918 includes high-speed processor 920, memory 922, and high-speed wireless circuitry 924. In the example, the image display driver 908 is coupled to the high-speed circuitry 918 and operated by the high-speed processor 920 in order to drive the left and right image displays of the image display of optical assembly 904. high-speed processor 920 may be any processor capable of managing high-speed communications and operation of any general computing system needed for head-wearable apparatus 902. The high-speed processor 920 includes processing resources needed for managing high-speed data transfers on communication 936 to a wireless local area network (WLAN) using high-speed wireless circuitry 924. In certain examples, the high-speed processor 920 executes an operating system such as a LINUX operating system or other such operating system of the head-wearable apparatus 902 and the operating system is stored in memory 922 for execution. In addition to any other responsibilities, the high-speed processor 920 executing a software architecture for the head-wearable apparatus 902 is used to manage data transfers with high-speed wireless circuitry 924. In certain examples, high-speed wireless circuitry 924 is configured to implement Institute of Electrical and Electronic Engineers (IEEE) 902.11 communication standards, also referred to herein as Wi-Fi. In other examples, other high-speed communications standards may be implemented by high-speed wireless circuitry 924.

The low power wireless circuitry 930 and the high-speed wireless circuitry 924 of the head-wearable apparatus 902 can include short range transceivers (Bluetooth™) and wireless wide, local, or wide area network transceivers (e.g., cellular or WiFi). The client device 938, including the transceivers communicating via the communication 934 and communication 936, may be implemented using details of the architecture of the head-wearable apparatus 902, as can other elements of network 940.

The memory 922 includes any storage device capable of storing various data and applications, including, among other things, camera data generated by the left and right, infrared camera 916, and the image processor 910, as well as images generated for display by the image display driver 908 on the image displays of the image display of optical assembly 904. While memory 922 is shown as integrated with high-speed circuitry 918, in other examples, memory 922 may be an independent standalone element of the head-wearable apparatus 902. In certain such examples, electrical routing lines may provide a connection through a chip that includes the high-speed processor 920 from the image processor 910 or low power processor 928 to the memory 922. In other examples, the high-speed processor 920 may manage addressing of memory 922 such that the low power processor 928 will boot the high-speed processor 920 any time that a read or write operation involving memory 922 is needed.

As shown in FIG. 9, the low power processor 928 or high-speed processor 920 of the head-wearable apparatus 902 can be coupled to the camera (visible light camera 912; infrared emitter 914, or infrared camera 916), the image display driver 908, the user input device 906 (e.g., touch sensor or push button), and the memory 922.

The head-wearable apparatus 902 is connected with a host computer. For example, the head-wearable apparatus 902 is paired with the client device 938 via the communication 936 or connected to the server system 932 via the network 940. server system 932 may be one or more computing devices as part of a service or network computing system, for example, that include a processor, a memory, and network communication interface to communicate over the network 940 with the client device 938 and head-wearable apparatus 902.

The client device 938 includes a processor and a network communication interface coupled to the processor. The network communication interface allows for communication over the network 940, communication 934 or communication 936. client device 938 can further store at least portions of the instructions for generating a binaural audio content in the client device 938's memory to implement the functionality described herein.

Output components of the head-wearable apparatus 902 include visual components, such as a display such as a liquid crystal display (LCD), a plasma display panel (PDP), a light emitting diode (LED) display, a projector, or a waveguide. The image displays of the optical assembly are driven by the image display driver 908. The output components of the head-wearable apparatus 902 further include acoustic components (e.g., speakers), haptic components (e.g., a vibratory motor), other signal generators, and so forth. The input components of the head-wearable apparatus 902, the client device 938, and server system 932, such as the user input device 906, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 902 may optionally include additional peripheral device elements. Such peripheral device elements may include biometric sensors, additional sensors, or display elements integrated with head-wearable apparatus 902. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 936 from the client device 938 via the low power wireless circuitry 930 or high-speed wireless circuitry 924.

Figure 10:
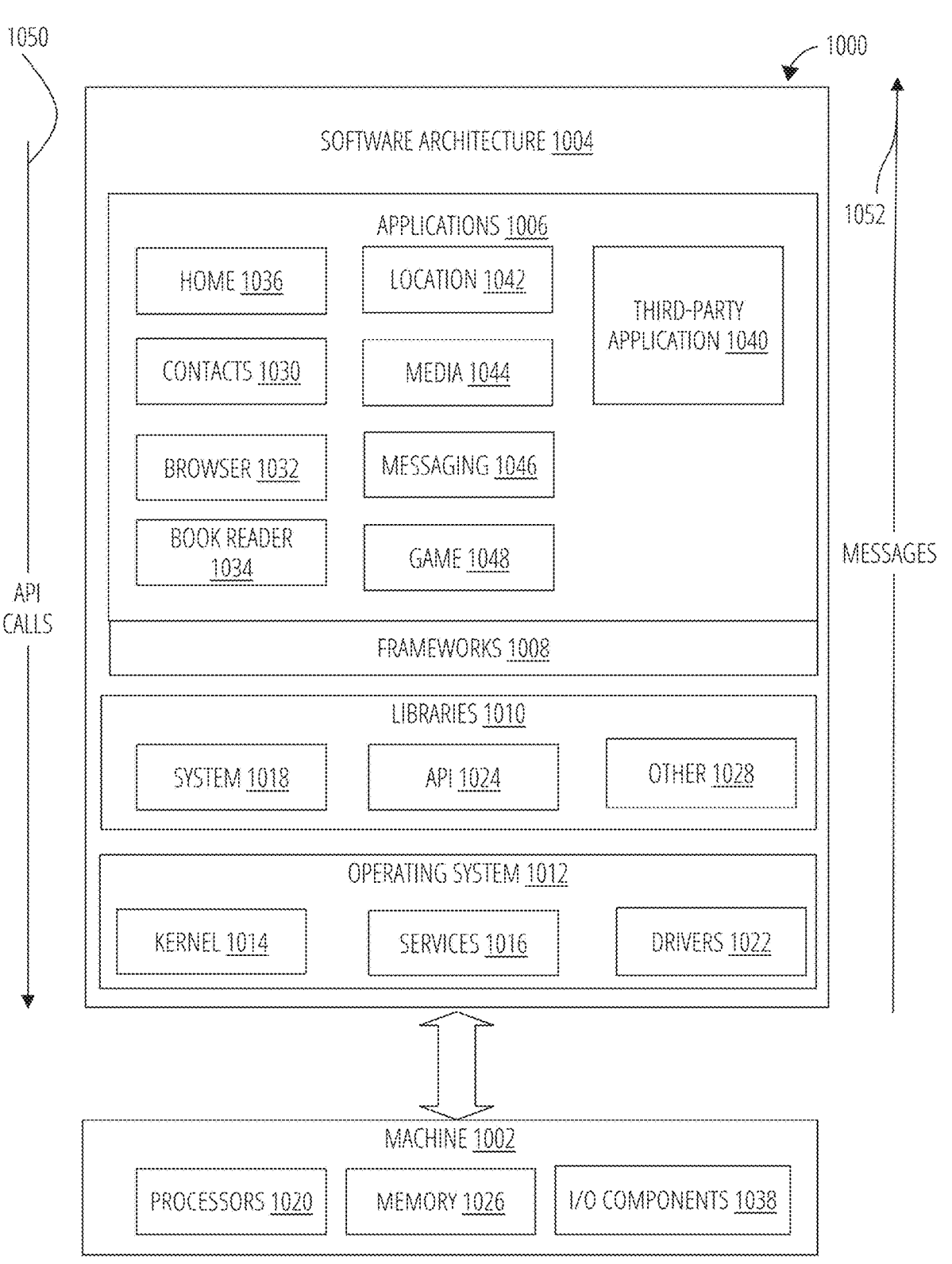
FIG. 10 is a block diagram showing a software architecture within which the present disclosure may be implemented, according to an example embodiment.

FIG. 10 is block diagram 1000 showing a software architecture within which the present disclosure may be implemented, according to an example embodiment. The software architecture 1004 is supported by hardware such as a machine 1002 that includes Processors 1020, memory 1026, and I/O Components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, Processor management (e.g., scheduling), Component management, networking, and security settings, among other functionalities. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example embodiment, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Figure 11:
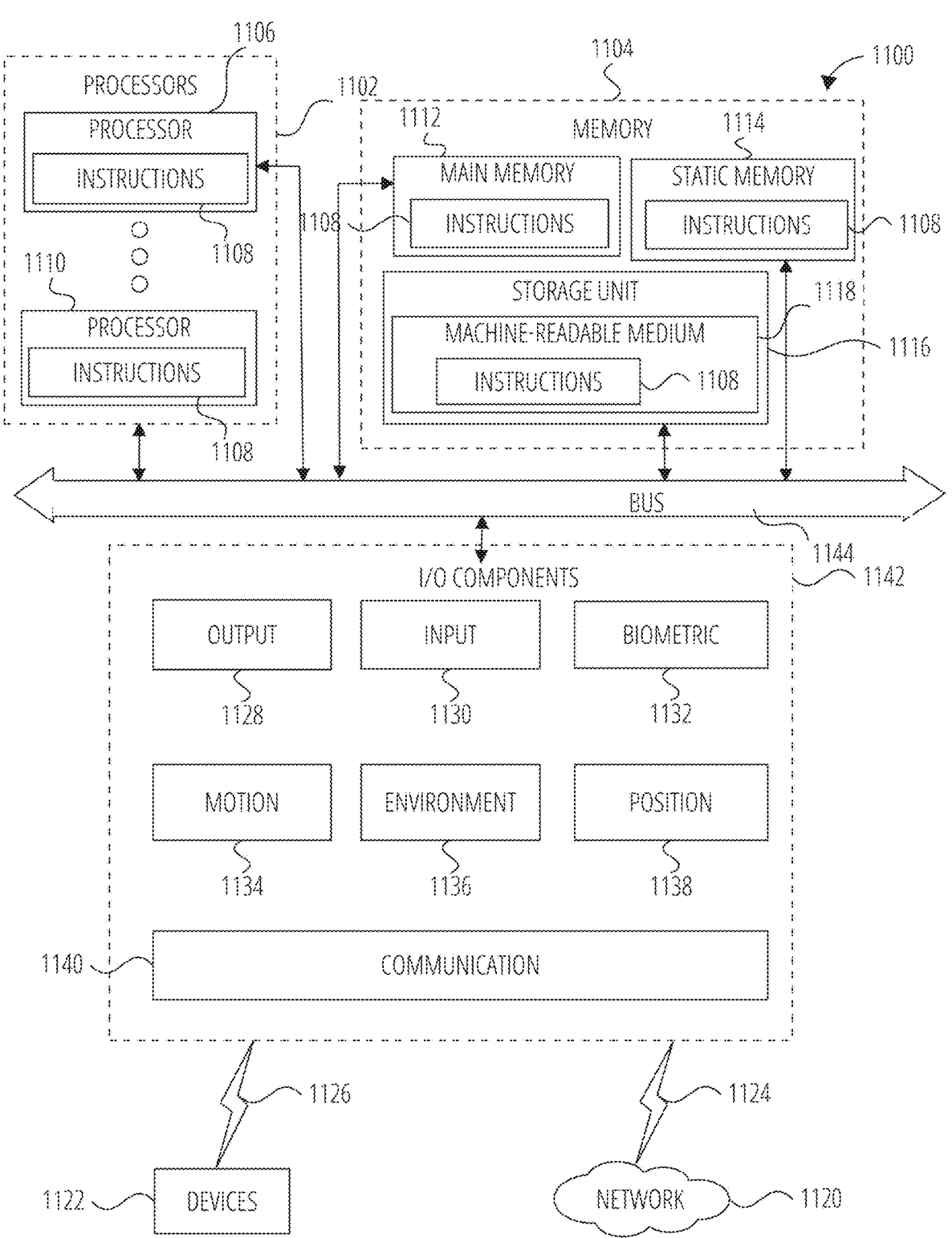
FIG. 11 is a diagrammatic representation of a machine in the form of a computer system within which a set of instructions may be executed for causing the machine to perform any one or more of the methodologies discussed herein, according to one example embodiment.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein.

The machine 1100 may include Processors 1102, memory 1104, and I/O Components 1142, which may be configured to communicate with each other via a bus 1144. In an example embodiment, the Processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1106 and a Processor 1110 that execute the instructions 1108. The term "Processor" is intended to include multi-core Processors that may comprise two or more independent Processors (sometimes referred to as "cores") that may execute instructions contemporaneously. Although FIG. 11 shows multiple Processors 1102, the machine 1100 may include a single Processor with a single core, a single Processor with multiple cores (e.g., a multi-core Processor), multiple Processors with a single core, multiple Processors with multiples cores, or any combination thereof.

The memory 1104 includes a main memory 1112, a static memory 1114, and a storage unit 1116, both accessible to the Processors 1102 via the bus 1144. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the Processors 1102 (e.g., within the Processor's cache memory), or any suitable combination thereof, during execution thereof by the machine 1100.

The I/O Components 1142 may include a wide variety of Components to receive input, provide output, produce output, transmit information, exchange information, capture measurements, and so on. The specific I/O Components 1142 that are included in a particular machine will depend on the type of machine. For example, portable machines such as mobile phones may include a touch input device or other such input mechanisms, while a headless server machine will likely not include such a touch input device. It will be appreciated that the I/O Components 1142 may include many other Components that are not shown in FIG. 11. In various example embodiments, the I/O Components 1142 may include output Components 1128 and input Components 1130. The output Components 1128 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1130 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1142 may include biometric Components 1132, motion Components 1134, environmental Components 1136, or position Components 1138, among a wide array of other Components. For example, the biometric Components 1132 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1134 include acceleration sensor Components (e.g., accelerometer), gravitation sensor Components, rotation sensor Components (e.g., gyroscope), and so forth. The environmental Components 1136 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1138 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1142 further include communication Components 1140 operable to couple the machine 1100 to a network 1120 or devices 1122 via a coupling 1124 and a coupling 1126, respectively. For example, the communication Components 1140 may include a network interface Component or another suitable device to interface with the network 1120. In further examples, the communication Components 1140 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1122 may be another machine or any of a wide variety of peripheral devices (e.g., a peripheral device coupled via a USB).

Moreover, the communication Components 1140 may detect identifiers or include Components operable to detect identifiers. For example, the communication Components 1140 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1140, such as location via Internet Protocol (IP) geolocation, location via Wi-Fi® signal triangulation, location via detecting an NFC beacon signal that may indicate a particular location, and so forth.

The various memories (e.g., memory 1104, main memory 1112, static memory 1114, and/or memory of the Processors 1102) and/or storage unit 1116 may store one or more sets of instructions and data structures (e.g., software) embodying or used by any one or more of the methodologies or functions described herein. These instructions (e.g., the instructions 1108), when executed by Processors 1102, cause various operations to implement the disclosed embodiments.

The instructions 1108 may be transmitted or received over the network 1120, using a transmission medium, via a network interface device (e.g., a network interface Component included in the communication Components 1140) and using any one of a number of well-known transfer protocols (e.g., hypertext transfer protocol (HTTP)). Similarly, the instructions 1108 may be transmitted or received using a transmission medium via the coupling 1126 (e.g., a peer-to-peer coupling) to the devices 1122.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method for calibrating a multi-camera visual tracking system comprising: disabling a first camera of the multi-camera visual tracking system while a second camera of the multi-camera visual tracking system is enabled; detecting a first set of features in a first image generated by the first camera after detecting that the temperature of the first camera is within the threshold of the factory calibration temperature of the first camera; and access and correct intrinsic parameters of the second camera based on the first set of features.

Example 2 includes example 1, further comprising: monitoring the temperature of the first camera; detecting that the temperature of the first camera is within the threshold of the factory calibration temperature of the first camera; turning on the first camera in response to detecting that the temperature of the first camera is within the threshold of the factory calibration temperature of the first camera; and accessing the first image generated by the first camera after the first camera is turned on.

Example 3 includes example 2, further comprising: accessing a second image that is generated by the second camera after the first camera is turned on; projecting the first set of features from the first image in the second image, wherein detecting the first set of features is based on factory calibration intrinsic parameters of the first camera.

Example 4 includes example 3, further comprising: detecting a second set of features in the second image before or after the first camera is turned on, the temperature of the second camera being higher than the factory calibration temperature of the first camera, wherein determining intrinsic parameters of the second camera is based on a projection of the first set of features in the second image and the second set of features.

Example 5 includes example 4, further comprising: matching pairs of the projection of first set of features in the second image with the second set of features, wherein determining intrinsic parameters of the second camera is based on the matched pairs of the projection of the first set of features in the second image and the second set of features.

Example 6 includes example 5, further comprising: filtering outliers feature pairs from the matched pairs, wherein determining intrinsic parameters of the second camera is based on the filtered outliers feature pairs.

Example 7 includes example 6, further comprising: identifying a relationship between the intrinsic parameters and the temperature of the second camera based on the filtered feature pairs; and forming a temperature profile based on the relationship.

Example 8 includes example 7, further comprising: measuring the temperature of the first camera after the first camera is turned on, the temperature of the first camera being higher than a factory calibration temperature of the first camera; identifying intrinsic parameters of the first camera based on the measured temperature of the first camera and the temperature profile; and applying the identified intrinsic parameters to the projected features of the first camera.

Example 9 includes example 1, further comprising: adjusting a second set of projected features from the second camera based on the temperature of the second camera and the intrinsic parameters of the second camera.

Example 10 includes example 1, further comprising: storing the intrinsic parameters of the second camera in a storage device of the multi-camera visual tracking system, wherein the multi-camera visual tracking system includes a multi-camera visual-inertial simultaneous localization and mapping system.

Example 11 is a computing apparatus comprising: a processor; and a memory storing instructions that, when executed by the processor, configure the apparatus to perform operations comprising: disable a first camera of a multi-camera visual tracking system while a second camera of the multi-camera visual tracking system is enabled; detect a first set of features in a first image generated by the first camera after detecting that the temperature of the first camera is within the threshold of the factory calibration temperature of the first camera; and access and correct intrinsic parameters of the second camera based on the first set of features.

Example 12 includes example 11, wherein the instructions further configure the apparatus to: monitor the temperature of the first camera; detect that the temperature of the first camera is within the threshold of the factory calibration temperature of the first camera; turn on the first camera in response to detecting that the temperature of the first camera is within the threshold of the factory calibration temperature of the first camera; and access the first image generated by the first camera after the first camera is turned on.

Example 13 includes example 12, wherein the instructions further configure the apparatus to: access a second image that is generated by the second camera after the first camera is turned on; project the first set of features from the first image in the second image, wherein detecting the first set of features is based on factory calibration intrinsic parameters of the first camera.

Example 14 includes example 13, wherein the instructions further configure the apparatus to: detect a second set of features in the second image before or after the first camera is turned on, the temperature of the second camera being higher than the factory calibration temperature of the first camera, wherein determining intrinsic parameters of the second camera is based on a projection of the first set of features in the second image and the second set of features.

Example 15 includes example 14, wherein the instructions further configure the apparatus to: match pairs of the projection of first set of features in the second image with the second set of features, wherein determining intrinsic parameters of the second camera is based on the matched pairs of the projection of the first set of features in the second image and the second set of features.

Example 16 includes example 15, wherein the instructions further configure the apparatus to: filter outliers feature pairs from the matched pairs, wherein determining intrinsic parameters of the second camera is based on the filtered outliers feature pairs.

Example 17 includes example 16, wherein the instructions further configure the apparatus to: identify a relationship between the intrinsic parameters and the temperature of the second camera based on the filtered feature pairs; and form a temperature profile based on the relationship.

Example 18 includes example 17, wherein the instructions further configure the apparatus to: measure the temperature of the first camera after the first camera is turned on, the temperature of the first camera being higher than a factory calibration temperature of the first camera; identify intrinsic parameters of the first camera based on the measured temperature of the first camera and the temperature profile; and apply the identified intrinsic parameters to the projected features of the first camera.

Example 19 includes example 11, wherein the instructions further configure the apparatus to: adjust a second set of projected features from the second camera based on the temperature of the second camera and the intrinsic parameters of the second camera.

Example 20 is a non-transitory computer-readable storage medium, the computer-readable storage medium including instructions that when executed by a computer, cause the computer to: disable a first camera of a multi-camera visual tracking system while a second camera of the multi-camera visual tracking system is enabled; detect a first set of features in a first image generated by the first camera after detecting that the temperature of the first camera is within the threshold of the factory calibration temperature of the first camera; and access and correct intrinsic parameters of the second camera based on the first set of features.

What is claimed is:

1. A method comprising:
turning off a first camera of a device comprising the first camera and a second camera, the second camera remaining powered after turning off the first camera;
detecting that a temperature of the first camera of the device decreased to be within a threshold of a factory calibration temperature of the first camera after turning off the first camera;
turning on the first camera in response to detecting that the temperature of the first camera of the device is within the threshold of the factory calibration temperature of the first camera;
capturing a first image with the first camera after turning on the first camera, and concurrently capturing a second image with the second camera while the second camera remains powered;
detecting a first set of features in the first image that is generated by the first camera in response to turning on the first camera; and
correcting intrinsic parameters of the second camera based on the first set of features in the first image using a temperature profile model that correlates temperature variations with intrinsic parameter adjustments.

2. The method of claim 1, wherein correcting the intrinsic parameters of the second camera further comprises:
accessing a second image that is generated by the second camera after operating the first camera; and
projecting the first set of features from the first image in the second image.

3. The method of claim 1, further comprising:
turning off the first camera while the second camera is on;
monitoring the temperature of the first camera;
turning on the first camera in response to detecting that the temperature of the first camera is within the threshold of the factory calibration temperature of the first camera; and
accessing the first image generated by the first camera after the first camera is turned on.

4. The method of claim 1, wherein detecting the first set of features in the first image is based on factory calibration intrinsic parameters of the first camera,
wherein the method further comprises:
detecting a second set of features in a second image generated by the second camera after the first camera is turned on, the temperature of the second camera being higher than the factory calibration temperature of the first camera,
wherein the intrinsic parameters of the second camera are based on a projection of the first set of features in the second image and the second set of features.

5. The method of claim 4, further comprising:
matching pairs of the projection of the first set of features in the second image with the second set of features in the second image,
wherein the intrinsic parameters of the second camera are based on the matched pairs of the projection of the first set of features in the second image and the second set of features.

6. The method of claim 5, further comprising:
filtering outliers feature pairs from the matched pairs,
wherein the intrinsic parameters of the second camera are based on the filtered outliers feature pairs.

7. The method of claim 6, further comprising:
identifying a relationship between the intrinsic parameters and the temperature of the second camera based on the filtered feature pairs; and
forming a temperature profile based on the relationship.

8. The method of claim 7, further comprising:
measuring the temperature of the first camera after the first camera is turned on, the temperature of the first camera being higher than the factory calibration temperature of the first camera;
identifying the intrinsic parameters of the first camera based on the measured temperature of the first camera and the temperature profile; and
applying the identified intrinsic parameters to the projected features of the first camera.

9. The method of claim 1, further comprising:
adjusting a second set of projected features from the second camera based on the temperature of the second camera and the intrinsic parameters of the second camera.

10. The method of claim 1, further comprising:
storing the intrinsic parameters of the second camera in a storage device of the device, the device comprising a virtual tracking system that includes a multi-camera visual-inertial simultaneous localization and a mapping system.

11. A device comprising:
a first camera;
a second camera;
one or more processors; and
a memory storing instructions that, when executed by the one or more processors, configure the device to perform operations comprising:
turning off the first camera, the second camera remaining powered after turning off the first camera;
detecting that a temperature of the first camera decreased to be within a threshold of a factory calibration temperature of the first camera after turning off the first camera;
turning on the first camera in response to detecting that the temperature of the first camera of the device is within the threshold of the factory calibration temperature of the first camera;
capturing a first image with the first camera after turning on the first camera, and concurrently capturing a second image with the second camera while the second camera remains powered;
detecting a first set of features in the first image that is generated by the first camera in response to turning on the first camera; and
correcting intrinsic parameters of the second camera based on the first set of features in the first image using a temperature profile model that correlates temperature variations with intrinsic parameter adjustments.

12. The device of claim 11, wherein correcting the intrinsic parameters of the second camera further comprises:
accessing a second image that is generated by the second camera after operating the first camera; and
projecting the first set of features from the first image in the second image.

13. The device of claim 11, wherein the operations further comprise:
turning off the first camera while the second camera is on;
monitoring the temperature of the first camera;

turning on the first camera in response to detecting that the temperature of the first camera is within the threshold of the factory calibration temperature of the first camera; and accessing the first image generated by the first camera after the first camera is turned on.

14. The device of claim 11, wherein detecting the first set of features in the first image is based on factory calibration intrinsic parameters of the first camera, wherein the operations further comprise:

detecting a second set of features in a second image generated by the second camera after the first camera is turned on, the temperature of the second camera being higher than the factory calibration temperature of the first camera, wherein the intrinsic parameters of the second camera are based on a projection of the first set of features in the second image and the second set of features.

15. The device of claim 14, wherein the operations further comprise:

matching pairs of the projection of the first set of features in the second image with the second set of features in the second image, wherein the intrinsic parameters of the second camera are based on the matched pairs of the projection of the first set of features in the second image and the second set of features.

16. The device of claim 15, wherein the operations further comprise:

filtering outliers feature pairs from the matched pairs, wherein the intrinsic parameters of the second camera are based on the filtered outliers feature pairs.

17. The device of claim 16, wherein the operations further comprise:

identifying a relationship between the intrinsic parameters and the temperature of the second camera based on the filtered feature pairs; and forming a temperature profile based on the relationship.

18. The device of claim 17, wherein the operations further comprise:

measuring the temperature of the first camera after the first camera is turned on, the temperature of the first camera being higher than the factory calibration temperature of the first camera;

identifying the intrinsic parameters of the first camera based on the measured temperature of the first camera and the temperature profile; and applying the identified intrinsic parameters to the projected features of the first camera.

19. The device of claim 11, wherein the operations further comprise:

adjusting a second set of projected features from the second camera based on the temperature of the second camera and the intrinsic parameters of the second camera.

20. A non-transitory computer-readable storage medium, the computer-readable storage medium including instructions that when executed by a computer, cause the computer to perform operations comprising:

turning off a first camera of a device comprising the first camera and a second camera, the second camera remaining powered after turning off the first camera;

detecting that a temperature of the first camera decreased to be within a threshold of a factory calibration temperature of the first camera after turning off the first camera;

turning on the first camera in response to detecting that the temperature of the first camera of the device is within the threshold of the factory calibration temperature of the first camera;

capturing a first image with the first camera after turning on the first camera, and concurrently capturing a second image with the second camera while the second camera remains powered;

detecting a first set of features in the first image that is generated by the first camera in response to turning on the first camera; and correcting intrinsic parameters of the second camera based on the first set of features in the first image using a temperature profile model that correlates temperature variations with intrinsic parameter adjustments.

* * * * *